United States Patent [19]

Moe

[11] 4,450,689
[45] May 29, 1984

[54] ARRANGEMENT IN OR RELATING TO A POWER PLANT

[76] Inventor: Per H. Moe, Amtm. Bangsgt. 7, N-3000 Drammen, Norway

[21] Appl. No.: 339,432
[22] PCT Filed: May 14, 1980
[86] PCT No.: PCT/NO80/00016
  § 371 Date: Jan. 5, 1982
  § 102(e) Date: Jan. 5, 1982
[87] PCT Pub. No.: WO81/03360
  PCT Pub. Date: Nov. 26, 1981
[51] Int. Cl.³ .............................................. F03G 7/04
[52] U.S. Cl. ..................................... 60/641.7; 60/675
[58] Field of Search ..................... 60/641.6, 641.7, 675

[56] References Cited

U.S. PATENT DOCUMENTS

| | | | |
|---|---|---|---|
| 1,493,368 | 5/1924 | Merz | 60/641.6 |
| 3,274,769 | 9/1966 | Reynolds | 60/641.2 |
| 3,953,971 | 5/1976 | Parker | 60/675 X |
| 4,030,301 | 6/1977 | Anderson | 60/641.7 |
| 4,087,975 | 5/1978 | Owens | 60/641.7 |
| 4,233,813 | 11/1980 | Simmons | 60/641.7 |

FOREIGN PATENT DOCUMENTS

| | | |
|---|---|---|
| 457085 | 3/1928 | Fed. Rep. of Germany . |
| 1476676 | 10/1969 | Fed. Rep. of Germany . |
| 2362138 | 6/1975 | Fed. Rep. of Germany . |
| 1200440 | 6/1959 | France .................. 60/675 |
| 52-13048 | 2/1977 | Japan .................. 60/641.7 |

Primary Examiner—Allen M. Ostrager
Attorney, Agent, or Firm—Larson and Taylor

[57] ABSTRACT

A power plant for exploitation of the temperature difference between different water layers in a pelagic area (2), comprising a closed system which is filled with ethane which is both in the liquid and vapor phases. The system comprises two heat exchanging apparatuses (13, 9) which are in fluid communication with each other, of which the first (13) supplies heat to the ethane by means of heat exchange with water from a relatively warmer water layer, while the other (9) removes heat from the ethane by means of heat exchange with water from a colder water layer, whereby a difference in pressure is created in the system which is utilized to take energy out of the system. In order to make the system large enough and the ethane pressure high enough to give a reasonable power yield, the heat exchanging apparatuses are placed in respective chambers (5, 4) which are comprised by cavities in solid or consolidated rock (1). The necessary fluid communications (6, 17) and water pipes (10, 12, 15, 16) are also blasted in the rock with fluid cross-sections large enough to make pressure losses small.

7 Claims, 1 Drawing Figure

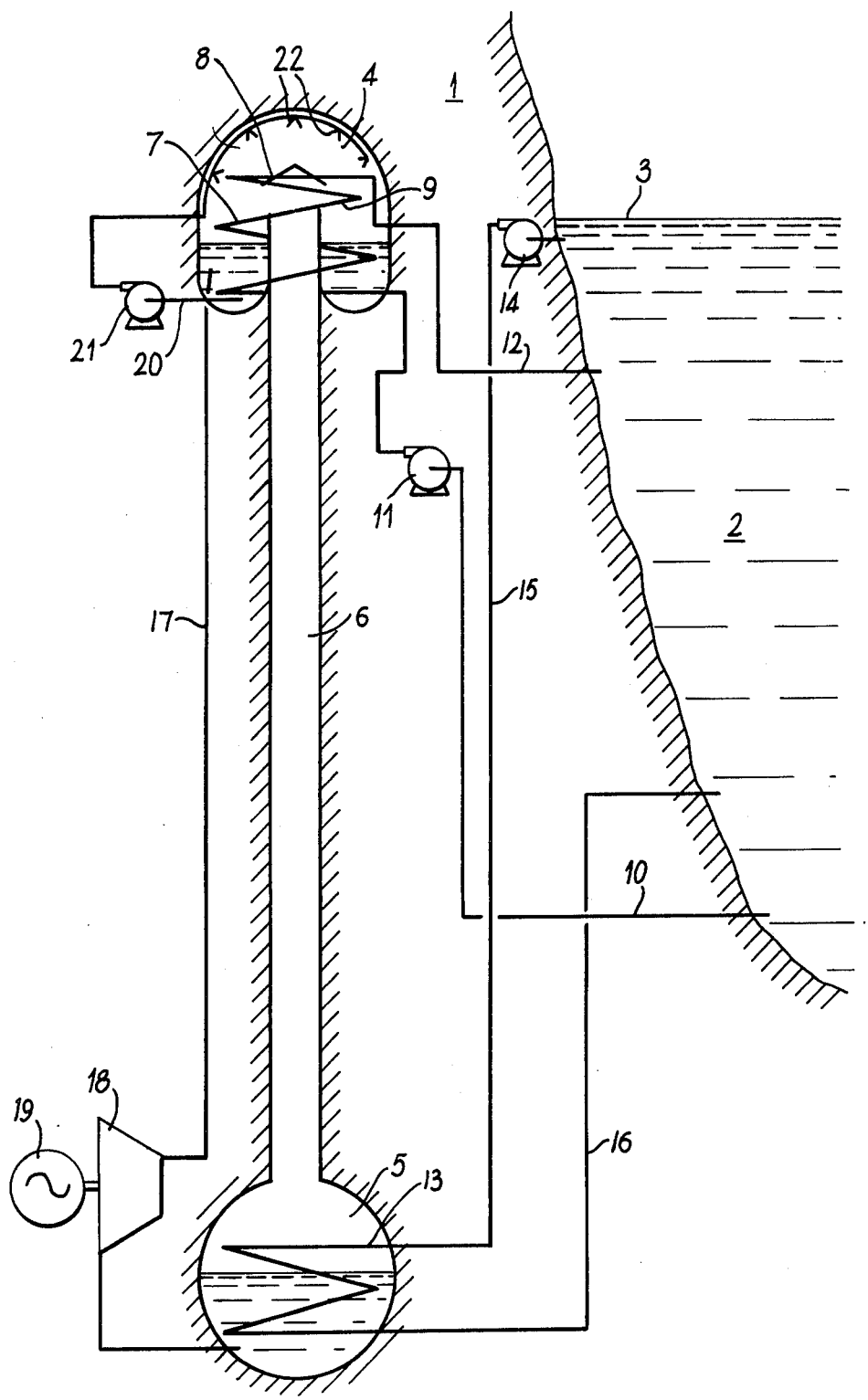

ARRANGEMENT IN OR RELATING TO A POWER PLANT

The present invention relates to an arrangement in or relating to a power plant for exploitation of the temperature difference between different water layers in a pelagic area, comprising a closed system which at least partially is filled with a fluid which at least partially exists in the liquid phase, said system comprising at least two heat exchanging apparatuses in fluid communication with each other, of which a first supplies heat to the fluid by heat exchange with water from a relatively warmer water layer while another removes heat from the fluid by heat exchange with water from a relatively colder water layer, whereby a pressure difference is created in the system which is utilized to take energy out of the system.

A power plant of the above mentioned type is known from the article "Power from the sun by way of the sea?" by J. H. Anderson in the periodical "Power", February 1965. The power plant described therein is in its entirety mounted on or in a floating vessel. The working fluid, being propane, is pumped up to a pressure of about 8 ato before it is vapourized in heat exchange with warm surface water. The propane vapour is used to drive turbines, whereupon it is condensed by heat exchange with colder water from a deeper water layer. The liquid propane is then again pumped around in the cycle as indicated above. In this known power plant cold water is taken in through a vertical pipe which extends from the vessel down to a depth of more than 600 m. Great difficulties will be associated with the installation of such a pipe and, furthermore, it will be highly exposed to forces induced by current and waves. Thus, the diameter of the pipe must necessarily be kept so small that relatively high pressure drops result. This will have grave adverse effects on the total efficiency of the power plant. Common to the above mentioned and other suggestions for power plants exploiting the temperature differences in nature, is that the working fluid exists in the vapour phase with relatively low pressure. This results in low power yield relative to the dimensions of the power plant, so that the construction costs become excessive relative to the yearly production of the power plant. If internal circulation losses and losses in the form of energy to drive auxiliary equipment are to be held at an acceptable level, the previously suggested power plants must be so large that they may not be built for sufficiently high pressures due to technical reasons.

The purpose of the invention is to solve these problems and provide a power plant for exploitation of the naturally occuring temperature differences in a pelagic area, which plant is technically feasible to build and provides a yield which can compete with conventional power plants. According to the invention one has realized, that in order to reach this goal, the problem is to increase both the size and pressure level substantially with respect to what has previously been regarded as possible. According to the invention this object has been realized by a power plant of the type mentioned by way of introduction, where the characteristic features are that said first and second heat exchanging apparatuses are arranged in respective chambers which are comprised by cavities in solid, resp. consolidated rock. Further advantageous features of the invention will appear from the dependent claims.

By placing the heat exchanging chambers in rock with sufficient covering, these chambers may be given a diameter in excess of 100 m and still withstand internal pressures of about 100 ato. Should corresponding chambers be made free standing in steel, one would have to use a wall thickness of more than 1 m, this being unthinkable both from a technical and economic point of view. The heat exchanging chambers and the necessary connecting shafts may be mined out by means of known methods developed for instance for conventional hydroelectric power plants. By letting the supply and discharge lines for water to the heat exchanges consist of mined shafts, these may be given such a large cross sectional area that the pressure drop is held to a relatively low level in spite of their substantial length.

According to the invention it is suggested that at least the working fluid containing cavities and shafts are sealed against water ingress by means of injection methods or the like, and that the surface is smoothened with sprayed concrete and thereafter jacketed with plates of steel or other material adapted to the modules of elasticity of the rock for complete gas sealing. The rock may be blasted by means of atomic charges. Further consolidation of the rock may be obtained by means of pre-stressed concrete linings according to the method used for high pressure water lines in rock. This method entails casting an inner lining having a certain clearance to the walls of the rock cavity. This clearance volume is grouted under high pressure, e.g. 30–40 ato. This gives rise to high compressive stresses in the lining which makes for a minimum deformation of the inner jacket when the latter is subjected to the internal pressure of the working fluid.

Furthermore, it is suggested according to the invention to use ethane as the working fluid. Ethane has a critical pressure as high as 48.2 atm, while its critical temperature is not much above 30° C. Ethane is a cheap gas which may be produced in large to rise more than 2,000 m.

For better understanding of the invention it will be described closer with reference to the examplifying embodiment shown schematically in the attached drawing.

Here, a rock area is generally designated 1 while an adjacent pelagic area is designated 2. The pelagic area is assumed to be sufficiently deep for a substantial temperature difference to exist between the warmer surface layer 3 and the cold deeper layers. The surface layer may for instance have a temperature of 25° C. while the temperature of the deeper layers approaches 4° C.

In the rock 1 is blasted an upper chamber 4 and a lower chamber 5 which are mutually connected by means of a generally vertical, blasted riser shaft 6. The riser shaft is continued some distance up into the upper chamber 4 by means of an extension 7, and some distance above the opening of the extension 7 a hood 8 is arranged. The insides of the chambers 4, 5 and the riser shaft 6 is smoothened with sprayed concrete and covered with a steel jacket (not shown). The extension 7 of the riser shaft 6 may consist of this jacket.

In the upper chamber 4 a heat exchanger 9 is arranged, said heat exchanger being provided with cold water through a line 10 and a pump 11. The cold water supplied leaves the heat exchanger 9 through a line 12 which opens into the ocean some distance below the surface 3. In the lower chamber 5 a second heat exchanger 13 is arranged, said exchanger being provided with warm surface water through a pump 4 and a supply line 15. This water leaves the heat exchanger 13 through a discharge line 16 which opens into the pelagic area 2 some distance away from the inlet of the first mentioned heat exchanger 9. The heat exchangers 9, 13 may for instance be formed of helical pipes provided with fins.

A pressure shaft 17 extends from the bottom of the upper chamber 4 down to a turbine 18 which lies on about the same level as the lower chamber 5. The turbine drives an electric generator 19. Likewise, a suction line 20 extends from the bottom of the upper chamber 4 to a recirculation pump 21 which feeds a number of spray nozzles 22 arranged in the upper part of the chamber 4.

The lines 10, 12, 15, 16 carrying water to and from the heat exchangers 9, 10, and the pressure shaft 17 and any lines for the resirculation pump 21 may advantageously be comprised by tunnels blasted in the rock.

The system comprising upper and lower chambers 4, 5, the riser shaft 6 and the pressure shaft 17 is in use visualized being filled with a fluid, for example ethane, which has such a high pressure that it is present both in the vapour and liquid phases. The dividing line between these two phases is drawn schematically as a waveform line in the two chambers. A certain temperature difference will exist, and thereby also a pressure difference, between the two chambers, the temperature and pressure being lowest in the upper chamber 4. This temperature difference will necessarily be somewhat smaller than the temperature difference between the upper, warmer water layer of the pelagic area 2 and its deeper, colder water layer.

When the power plant is in normal operation, the pump 14 supplies warm surface water to the heat exchanger 13 in the lower chamber 5. The heat which thus is supplied to the ethane in the chamber causes evaporation of the liquid ethane and possibly some overheating of the vapour. Due to the higher pressure in the chamber 5, the gaseous ethane rises through the riser shaft 6 to the upper chamber 4. Here the ethane gas is cooled sufficiently for it to condense and collect at the bottom of the chamber 4. If necessary the condensation may be accelerated as droplet growth on a spray of sub-cooled liquid ethane which is sprayed out through nozzles 22 in the upper portion of the chamber by means of the recirculation pump 21. The hood 8 above the extension 7 of the riser shaft 6 prevents liquid ethane from being sprayed down into the riser shaft and, furthermore, aids in distributing the ascending gaseous ethane in the upper chamber 4. The latent heat of evaporation which is removed from the condensing ethane is brought out of the system by means of the heat exchanger 9 which is supplied with cold water from a deeper water level through the line 10 and the pump 11.

The liquid ethane which collects in the bottom of the upper chamber 4, is permitted to flow down through the pressure shaft 17 to the turbine 18. The liquid column in the pressure shaft 17 causes of course a much higher static pressure at the turbine inlet than the back pressure created by the gas column in the riser shaft 6. This pressure difference is used to drive the turbine 18, which may be of the Pelton type. The turbine in turn drives the generator 19. From the turbine the generally liquid ethane flows into the lower chamber 5, where it once again is vapourized and rises up through the riser shaft 6, as described above.

The net production of the power plant consists of the effect delivered by the generator 19 minus the effect required to drive the circulation pumps 11, 14 and possibly plus 21 and other minor power absorbing auxiliary equipment. Since the power plant almost in its entirety is placed in solid rock, the flow cross sectional areas both for the working fluid and water may be made so large that the pressure losses, and thus the minus side of the calculation, may be kept at a relatively low level. By locating the lower chamber deep into the ground one also obtains a positive, however little, addition in the form of geothermal energy.

It will be apparent to the skilled person that the preceding examplifying embodiment is shown in a very schematic manner and that the invention may be varied in a number of ways within the frame of the appended claims. Thus, the shafts and lines shown may wholly or partly be constituted by several separate, generally parallel runs. Similarly, the heat exchangers and their chambers may be divided into separate sections if this should be advantagous from technical, maintenance or safety related reasons.

I claim:

1. A power plant arrangement for exploiting the temperature difference between different water layers in a pelagic area, comprising:
   a closed system which is at least partially filled with a fluid which at least partially exists in the liquid phase,
   said system comprising at least two heat exchanging apparatuses in fluid communication with each other,
   one of said heat exchangers being in communication with a relatively warmer water layer of the pelagic area for supplying heat to the said fluid, and the other heat exchanger being in communication with a relatively colder water layer of the pelagic area for removing heat from the said fluid, whereby a pressure difference is created in the system which is utilized to take energy out of the system,
   each of said first and second heat exchanging apparatuses being arranged in respective chambers which are comprised of cavities in solid or consolidated rock.

2. Arrangement according to claim 1, characterized in that said fluid communication extends between said chambers and that the energy is taken out in the part of the fluid communication which carries fluid in the liquid phase.

3. Arrangement according to claim 1, characterized in that the fluid communication between said chambers comprises at least one shaft in said rock.

4. Arrangement according to claim 1, characterized in that said cavities are smoothened with sprayed concrete and provided with a metal jacket.

5. Arrangement according to any one of claims 1, 2, 3 or 4, characterized in that said respective chambers are arranged at a difference in level which is approximately equal to the pressure head of the liquid phase of the fluid corresponding to said pressure difference, and that the upper of the chambers is arranged generally level with the water surface.

6. Arrangement according to claim 5, characterized in that said fluid is comprised substantially by ethane.

7. Arrangement according to a preceding claim, characterized in said fluid is near its critical temperature.

* * * * *